J. RAIBER.
Apparatus for Cooling Wort during Fermentation
No. 208,763. Patented Oct. 8, 1878.
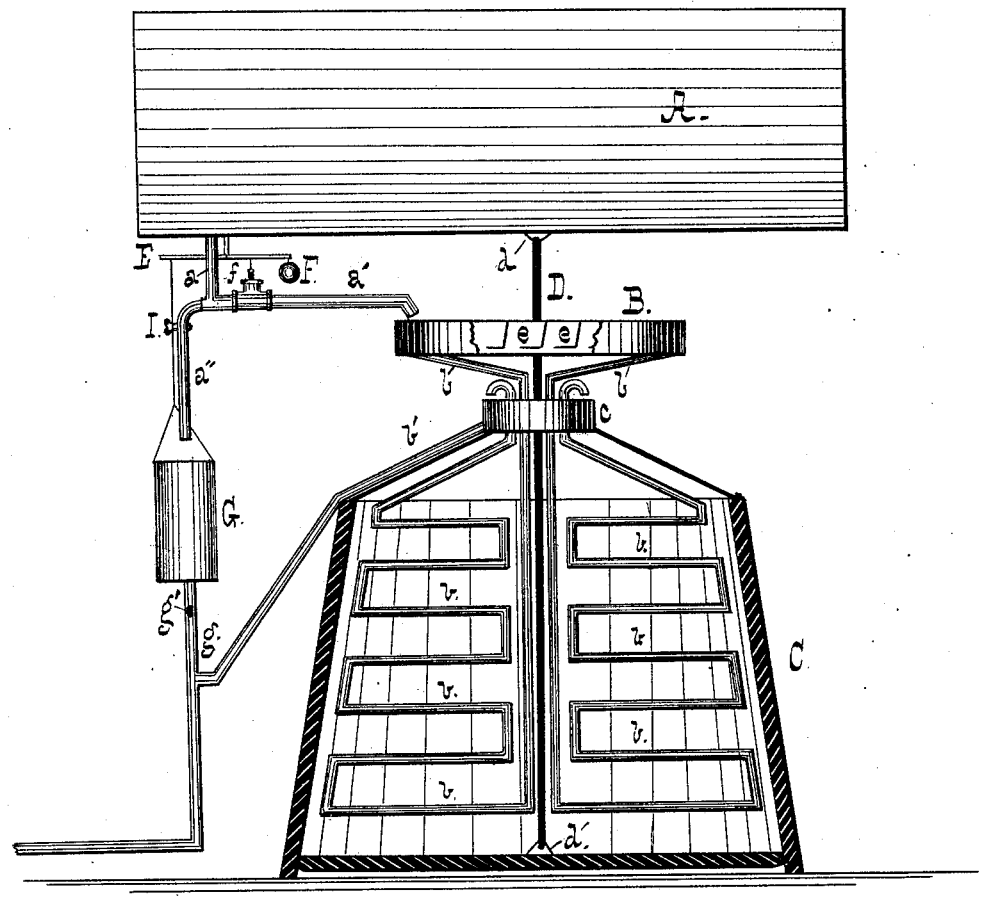

UNITED STATES PATENT OFFICE.

JOSEPH RAIBER, OF BALTIMORE, MARYLAND.

IMPROVEMENT IN APPARATUS FOR COOLING WORT DURING FERMENTATION.

Specification forming part of Letters Patent No. 208,763, dated October 8, 1878; application filed September 3, 1878.

*To all whom it may concern:*

Be it known that I, JOSEPH RAIBER, of Baltimore city, State of Maryland, have invented certain new and useful Improvements in Fermenting-Vats; and I hereby declare the same to be fully, clearly, and exactly described as follows, reference being had to the accompanying drawing, in which the said device is illustrated in side elevation, partly in section.

This invention relates to apparatus for the fermentation of malt liquors; and it consists, broadly, in a fermenting-vat provided with one or more cooling-chambers and mechanism for automatically producing an intermittent motion of the cooling-chambers within the vat, and specifically in the particular form of device illustrated in the drawing, and hereinafter described.

The chemical change which takes place in the fermenting-vat—namely, the conversion of sugar into carbonic acid and alcohol—is attended by an elevation of temperature which, except in cold weather, will so accelerate the progress of the fermentation as to injure the product.

It is customary, therefore, in brewing-establishments to place "swimmers" in the fermenting-vats, the swimmers being sheet-metal vessels containing a quantity of ice sufficient to partially immerse them in the wort, in which they float upright. This is attended with inconveniences and disadvantages which it is the object of my present invention to obviate.

As is well known to brewers, the fermenting wort must not be agitated during the progress of the fermentation; but as the convective currents caused by the swimmers are insufficient to produce uniformity of temperature throughout the wort, it is necessary and customary to occasionally stir the contents of the vat.

The object of my invention is to furnish an apparatus for automatically effecting this stirring while subjecting the wort to the minimum degree of agitation compatible with the attainment of the desired end.

In the accompanying drawing, A represents a suitable tank for containing cold water, from which leads a pipe, $a$, that branches, as shown, one arm, $a''$, being provided with a stop-cock, I, the other, $a'$, being adapted to deliver the water upon a wheel, B. This latter is rigidly attached to a shaft, D, mounted in bearings $d$ $d'$, respectively upon the tank A and vat C.

The buckets $e$ of the wheel B do not extend quite to the bottom of the wheel, leaving a space through which the water flows to the pipes $b$ $b$. These are coiled back and forth in the fermenting-vat C, and finally empty into an annular trough, $c$, which is mounted upon the vat, as shown. A waste-pipe, $b'$, leads from the pan or trough $c$ to the pipe $g$.

In the limb $a'$ of the pipe $a$ is situated a valve, $f$, that is attached to a lever, E, one end of which carries a counterpoise, F, and the other supports the vessel G, which slides freely but water-tight upon the pipe $g$. The latter is perforated, as shown at $g'$.

The operation of the device is as follows: The wort to be fermented being pumped into the vat C, the fermentation is set up and allowed to proceed until it is observed that the temperature in the vat has reached the proper point. Cold water being allowed to flow from the tank A until the pipes $b$ $b$ are filled, the valve $f$ is allowed to close and the flow of water ceases.

It being desired that the pipes be caused to move, say, every twenty minutes, the cock 1 is turned and set so as to fill the vessel G in that time, the counterpoise F being so placed on the lever E as just to balance the vessel G when nearly full of water. Pending the filling of the vessel G, the valve $f$ remains closed and the pipes $b$ $b$ are at rest. As soon, however, as the quantity of water in the vessel G is sufficient to overcome the weight of the counterpoise F, the vessel descends upon the rod $g$, and discharges its contents through the orifice $g'$ into the waste-pipe $g$. As the vessel descends the valve $f$ is opened, admitting a current of water to the wheel B, which is thereby set in motion, carrying with it the pipes $b$ $b$.

Upon the discharge of the contents of the vessel G the preponderance of weight is again in favor of the counterpoise F, which descends and closes the valve $f$. The vessel is again filled, and the operation repeated indefinitely.

The motion of the coils $b$ is not sufficient to in any way impair the quality of the beer c injuriously affect the progress of the fermentation, while still being ample to insure perfect uniformity of temperature throughout the contents of the vat.

Having thus described my invention, what I claim as new, and desire to secure by Letters Patent, is—

1. In an apparatus for regulating the temperature of wort during fermentation, a vat containing pipes or chambers for holding a cooling medium, in combination with mechanism for automatically causing an intermittent motion of the said pipes or chambers, substantially as described.

2. In combination with the pipe $a'$, having valve $f$, the lever E, vessel G, perforated pipe $g$, and cock I, substantially as described.

3. In combination with mechanism for intermittently admitting a current of water, the fermenting-vat C, having water-wheel B and pipes $b$, leading therefrom, substantially as described.

JOSEPH RAIBER.

Witnesses:
R. D. WILLIAMS,
TUSTIN SACHS.